Patented Aug. 22, 1944

2,356,565

UNITED STATES PATENT OFFICE 2,356,565

GLUCOSIDIC COMPOUNDS AND PROCESS OF MAKING THEM

August Chwala, Vienna, Germany; vested in the Alien Property Custodian

No Drawing. Application July 7, 1939, Serial No. 283,323. In Germany July 15, 1938

13 Claims. (Cl. 260—210)

This invention relates to novel compounds of a glucosidic nature and to a process for the production of such compounds.

An object of my invention is to obtain compounds of a glucosidic nature, which are inter alia particularly useful as cleansing, washing and wetting agents in the textile industry and similar fields of manufacture, and further as dispersing, emulsifying and protecting agents and the like.

Another object of my invention is to provide a method for producing compounds of a glucosidic nature which is practicable on a commercial scale.

Other objects will appear from the following detailed description.

For the production of compounds of a glucosidic nature of higher molecular weight the procedure hitherto adopted in practice has been either to heat acetylated monosaccharides with higher molecular alcohols in the presence of condensing agents such as zinc chloride, or to react upon aceto sugar halides with higher alcohols in the presence of acid binding agents. In both cases the sugar hydroxyls blocked by acetylation are subsequently set free by hydrolysis.

The etherification of sugars with higher molecular alcohols, of which the fatty alcohols come primarily into consideration for the purpose of obtaining capillary active compounds, gives rise to very considerable technical difficulties owing to the reluctance of sugars to react with alcohols of fatty character.

The present invention is based on the principle of etherifying a sugar with an alcohol having a relatively short carbon chain, i. e. one or more chains containing not over 5 carbon atoms, and which alcohol contains a reactive halogen atom, thereby forming a halo-alkyl glucoside and causing this latter to combine with a further organic group to form a higher molecular compound. The method according to the invention thus consists broadly in converting alcohols of low molecular weight containing reactive halogen, to alkyl glucosides, and, if the object is to obtain high molecular substances having particular capillary activity, in coupling the alkyl glucosides directly or indirectly with organic, preferably high molecular organic compounds, in the same or a separate working operation, with the aid of the reactive group. The method according to the invention leads to a large number of new compounds of a glucosidic nature which are all characterised by the feature that they have a low alcohol in the glucosidic link, which, in its turn, is capable of being esterified, etherified, or, with the interaction of an amino group, of being acetylated or alkylated. The alkyl-glucosides prepared in accordance with the invention, which contain reactive halogen in the alcohol radical afford, first and foremost, the possibility of obtaining, by selection from the multifarious organic compounds to be coupled with the aid of these groups, high molecular, novel compounds, the properties of which can be adapted to suit particular uses by appropriate selection of the components used in the coupling stage, or by subsequently modifying the compounds obtained by the coupling of the components particularly with substitution of the reactive hydrogen atoms present in said compounds by substituents influencing their solubility in water.

Without it being necessary to effect temporary blocking of the sugar hydroxides, the glucoside formation proceeds very easily and smoothly, and this constitutes a very significant advantage of the invention from the point of view of its practical operation on a technical scale.

The following substances are suitable for example as the sugar constituent of the alkyl-glucosides according to the invention: Pentoses (e. g. arabinose and xylose); hexoses (e. g. glucose, fructose, gelactose); furthermore, disaccharoses (e. g. milk sugar, cane sugar); polysaccharoses (e. g. starch, dextrin) intramolecular anhydrides of sugars and other industrial products rich in sugar such as starch sugar or wood sugar.

Low molecular alcohols useful for effecting the glucosidification, and containing at least one reactive halogen atom, are for example: glycol-chlorohydrin $CH_2Cl$—$CH_2OH$, glycol-bromohydrin $CH_2Br$—$CH_2OH$, propyleno-chlorohydrin $CH_3CHOH$—$CH_2Cl$, glycerol-chlorohydrin $CH_2OH$—$CHOH$—$CH_2Cl$, glycerol-bromohydrin $CH_2OH$—$CHOH$—$CH_2Br$, glycerol-alpha, gamma-dichlorohydrin, glycerol-alpha, gamma-dibromohydrin, monochloroether of di- and polyglycol and polyglycerol.

The glucosidification is effected by causing the sugar component to react with the halogen-containing low molecular alcohols and more particularly with the halohydrins, the alcohols being present in excess and the said reaction being carried out while applying heat and in the presence of an acid catalyst. The following substances are particularly suitable for use as catalysts: sulphuric acid, sulphuric acid in co-mixture with a bi-sulphate, phosphoric acid, and phosphoric acid in co-mixture with an acid phosphate, perchloric acid, sulfonic acids, such as benzene-sulfonic acid, toluene-sulphonic acid, naphthalenesulfonic acid, di-iso-butyl-naphthalenesulfonic acid, isethionic acid, also, carboxylic acids, for example oxalic acid, trichloracetic acid and the like, which all have less tendency to exert a reversing action than hydrochloric acid. After completion of glucosidification the acid is partially neutralised with sodium carbonate, sodium bicarbonate, disodium phosphate or the like, after which the surplus halogen-hydrin is distilled off, preferably in a vacuum. The hydrochloric acid which continues to split off in small quantities from the halogenated alcohols, and which has a marked tendency to diminish the yield of the reaction, is neutralised by the further addition of sodium carbonate or bicarbonate, disodium phosphate or the like, prior to the distilling off of the halogen-hydrin. The crude glucosides obtained are syrupy to vitreous masses which are generally obtained with a glucoside content of 70 to 80%, and which are suitable in this form to be subjected directly to further reactions.

Examples of reactable compounds capable of being combined with these halogen-alkyl glucosides are higher molecular carboxylic acids, phenols, proteins, sulphonic acids, and amines.

As carboxylic acid there may be used higher fatty acids, resinic acids and naphthenic acids, the salts of which react to form higher molecular ester glucosides, e. g. with beta-chloroethyl glucosides, in accordance with the equation

R denoting a higher hydrocarbon group or radical. These carboxylic acids are used in the form of their salts (e. g. sodium salts).

As fatty acids, not only the acids obtainable from vegetable and animal fats are suitable but also their saturated derivatives obtained by hydrogenation and also the carboxylic acids obtainable by oxidation of higher hydrocarbons such as crude petroleum, distillation tar, or paraffin.

Further, the above-mentioned halogen containing glucosides are also capable of being combined with the alkali salts of higher molecular phenols, preferably with those the hydroxyl group of which is more pronouncedly acid than is the case with nucleohalogenated derivatives or with the phenols having a plurality of hydroxyl groups.

By combining the above-mentioned phenolates with beta-chloroethyl glucoside there are obtained ether-glucosides, for instance in accordance with the equation $$C_8H_{17}C_6H_3(Cl)ONa + ClC_2H_4OC_6H_{11}O_5 =$$
$$C_8H_{17}C_6H_3(Cl)OC_2H_4OC_6H_{11}O_5 + NaCl$$

The aromatic nucleus contained in this compound may, if desired, be converted by hydrogenation into a saturated ring. As an example of an easily obtainable higher molecular phenolic body there may be used lignin which reacts readily with halogenated glucoside in alkaline solution.

Albuminous bodies, preferably those of an acid character, are capable, in the form of their metal compounds, of being coupled with halogen-alkyl glucosides. Examples of such albuminous bodies are casein, protalbinic acid and lysalbinic acid.

A further possibility of coupling hydrocarbon radicals with sugars consists in converting halogenated glucosides, by heating with ammonia or amines under pressure, into amino-glucosides and acylating these latter in the amino group by reacting thereupon with higher carboxylic acids. Thus, in accordance with the equation:

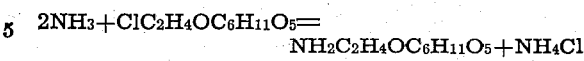
$$NH_2C_2H_4OC_6H_{11}O_5 + NH_4Cl$$

from beta-chloroethyl glucoside and ammonia there is formed beta-aminoethyl glucoside, into the amino group of which there may be introduced an acyl radical by treatment with higher fatty, resinic or naphthenic acids or with halides or anhydrides thereof, if desired or necessary in the presence of acid neutralizing agents such as soda, potassium lye or the like. Instead of halides of higher carboxylic acids there may also be employed the halides of aromatic sulphonic acids preferably having one or more side chains of considerable length in the aromatic nucleus.

Finally, higher hydrocarbon radicals may be combined with sugars by way of the described halogenated alkyl glucosides, for example beta-chloro- or bromo ethyl glucoside, by converting the said beta-chloro- or bromoethyl glucoside with higher molecular amines, for example with dodecylamine, aminoparaffin (obtained from chloro-paraffin by conversion with ammonia) or with nitrosamines obtained from terpene hydrocarbons.

If beta-aminoethyl glucoside or beta-methylamino glucoside or similar compounds be used higher molecular glucosides are obtainable by reacting with higher molecular alkyl halides, for example octadecyl bromide, chloro-paraffin, higher molecular chlorohydrins such as may be obtained from olefines resulting from the cracking of hydrocarbons, by the adding on of hypohalogenic acid, and the like; the nitrogen in these higher molecular glucosides may also, if desired, be converted into its quaternary form.

Finally, amino-alkyl glucosides may be condensed with phenols in the presence of formaldehyde, whereby N-oxybenzylated amino ethyl glucosides are obtained.

The products obtainable by the methods specified may be classified as belonging to the following three classes of glucosidic compounds:

1. Halogen-alkyl-glucosides corresponding to the formula $$Hal—R_1—Y$$

wherein Hal is a halogen such as chlorine or bromine, $R_1$ is a bivalent low molecular alkyl radical having 2 to 5 carbon atoms directly bound to each other and Y is a sugar group glucosidically combined with the alkyl radical $R_1$.

2. Amino-alkyl-glucosides corresponding to the formula Am—$R_1$—Y wherein Am is an amino radical, for example $NH_2$—, $NH(CH_3)$—, $NH(C_2H_4OH)$—, $N(CH_3)_2$—, $R_1$ is a bivalent low molecular alkyl radical having 2 to 5 carbon atoms directly bound to each other and Y is a sugar group glucosidically combined with the alkyl radical $R_1$.

3. High molecular glucosides corresponding to the formula R—X—$R_1$—Y wherein R is a high molecular hydrocarbon radical containing at least 6 carbon atoms, X is a linking group, for example

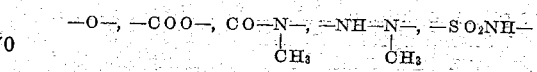

or the like, $R_1$ is a bivalent low molecular alkyl radical having 2 to 5 carbon atoms directly bound to each other, and Y is a sugar group glucosidically combined with the alkyl radical $R_1$.

The low molecular alkyl radicals $R_1$ as well as the high molecular hydrocarbon radicals R referred to in the above specified formulae may contain various substituents.

The higher molecular glucosides obtained by the described reactions are soluble in water; the solutions are frothy and are insensitive to hardening agents in water, alkaline solutions, and dilute acids in the concentrations used in the textile industry, as well as the solutions of metal salts. They possess good qualities as dispersing agents for dye pigments and the like and are colloid protecting agents for example for protecting freshly formed calcium soap against flocculation and may be used as washing, wetting, and cleansing agents, even in acid baths or baths containing metal salts. The addition of substances of this kind to mercerising liquors has a favourable effect on the wetting and shrinking of cellulose fibres. In concentrated aqueous solutions they have valuable emulsifying properties in respect to vegetable, animal and mineral oils and also fatty acids; mixtures of fatty acids and oils can also with advantage be finely dispersed with their aid.

If the compounds according to the invention be added to dye baths a retarding of the dyeing action is obtained, particularly in vat dyeing. By "soaping" vat and naphthol dyes with higher molecular glucosides, bright clean colours are obtained which are fast to rubbing. The compounds of a glucosidic nature containing high molecular aliphatic radicals impart to textile materials treated therewith a pleasing, soft and springy texture.

Those of the above-described compounds which have a plurality of free phenolic hydroxyl groups are useful as tanning auxiliary agents.

Examples 1. 80 parts of anhydrous glucose are heated with 380 parts of anhydrous glycolchlorohydrin and 7 parts of a mixture of 50 parts of phosphoric acid, 89 per cent strong, and 6 parts of caustic soda, to a temperature of 100° C. with agitation and frequent shaking, until a sample only slightly reduces Fehling's solution. If the phosphoric mixture be replaced by 2 parts of concentrated sulphuric acid this state is reached after about three hours. To the resulting yellow solution, when cold there is added a concentrated aqueous solution of 7 parts of calcined soda, after which the excess chlorohydrin is distilled off as rapidly and completely as possible in a vacuum; finally, this mass is heated in vacuum for about 45 minutes, to a temperature of 110 to 120° C. The residue, which gives an alkaline reaction with litmus, is dissolved in hot alcohol, filtered to remove undissolved salts, after which the alcohol is evaporated until a yellowish solid mass, capable of being pulverized is obtained, the yield being 117 parts containing 64 per cent of beta-chloroethyl glucoside. To prevent yield-reducing reversal of the reaction small quantities of a soda solution are added if necessary at frequent intervals during the working up of the glucoside, and, also if necessary, a small quantity of disodium phosphate, to neutralise any acid reaction that may arise. Instead of 380 parts of glycol-chlorohydrin there may be used with otherwise unchanged proportions 590 parts of anhydrous glycol-bromohydrin.

In place of the mixture referred to above consisting of phosphoric acid and di-acid phosphate or in place of sulfuric acid a mixture of 2 parts of sulfuric acid and 1 part of sodiumbisulfate or 5 parts of perchloric acid or 4 parts of benzenesulfonic acid or naphthalenesulfonic acid or di-iso-butyl-naphthalene sulfonic acid may be used.

2. 80 parts of glucose are treated with 400 parts of glycerolmonochlorohydrin and 2 parts of concentrated sulphuric acid, as in Example 1. After the addition of the soda solution the surplus glycerol monochlorohydrin is distilled off in a vacuum to such an extent that the residue constitutes a thin syrup which is stirred up repeatedly with anhydrous acetone for the purpose of removing any glycerol monochlorohydrin that may still be present therein.

After drying off any still adhering acetone by heating in a vacuum there is obtained a vitreous mass, the main constituent of which is gamma-chloro-beta-oxypropyl glucoside

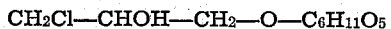

$$CH_2Cl-CHOH-CH_2-O-C_6H_{11}O_5$$

The mass obtained contains some 68 per cent of this glucoside.

3. 30 parts of milk sugar are heated with 100 parts of glycolchlorohydrin and one part of concentrated sulphuric acid for 3½ to 4 hours, with frequent stirring to a temperature of 90 to 95° C. After this time the reaction with Fehling's solution has disappeared. There is then added to the mixture a solution of 1.2 parts of soda in 3 parts of water, and the surplus chlorohydrin is distilled off in a vacuum. The further working up is effected in accordance with Example 1. There is obtained a yellow solid mass containing 71 per cent of a mixture of beta-chloroethyl glucoside and beta-chloroethyl galactoside.

4. 100 parts of anhydrous wood sugar rich in pentoses are heated with 400 parts ethylenechlorohydrin and 4 parts concentrated sulfuric acid or 8 to 10 parts oxalic acid or trichloracetic acid, while stirring, over a waterbath until a Fehling's solution is no more or only slightly reduced by the reaction mixture. Further working is carried out as described in Example 1. A reaction mixture is obtained containing some 80% halogen-alkyl-glucoside.

5. Beta-chloroethyl glucoside is produced by heating to 95° C. for 10 to 12 hours and stirring a mixture of 20 parts of dried starch, 100 parts of ethylene chlorohydrin and 1 part of concentrated benzenesulphonic acid; the further working up is effected as in Example 1.

6. 121 parts of a 54 per cent beta-chloroethyl glucoside are heated with 240 parts of concentrated aqueous ammonia for 2 hours under pressure to a temperature of 115–120° C. After the addition of 1.5 parts caustic soda the mixture is evaporated to half its volume, filtered, and concentrated in a vacuum, the temperature of the residue being retained for ½ to ¾ hour at a temperature of 105° C. The residue is then dissolved in water, and yields 170 parts of a clear brownish liquid containing some 54 parts of beta-aminoethyl glucoside.

7. 51.4 parts of 74 per cent beta-chloroethyl glucoside are converted with 180 parts of 13 per cent methylamine for 2½ hours at a temperature of 110° C. and further worked up in accordance with Example 6. After the addition of 7 parts of sodium hydroxide there are ultimately obtained 90 parts of a solution containing some 33 parts of beta-methylaminoethyl glucoside.

8. 3.7 parts of the glucosidic mixture according to Example 3 are dissolved in 4 parts of water, after which 2 parts of diamylamine and 7.5 parts of alcohol are added, and the mixture heated under pressure and with agitation, for 4 to 5 hours to a temperature of 130° C. After cooling, 4.4 parts of caustic soda dissolved in 10 parts of water are added, and the alcohol and surplus amine are distilled off, the resulting clear solution containing diamylaminoethyl glucoside.

9.                                                              Parts
Beta-chloroethyl glucoside, 64 per cent strong, according to Example 1_____ 2.5
Calcined soda, pulverised_____ 0.04
Anhydrous pulverised oleic soap_____ 1.5 are intimately mixed together in an open vessel and heated to a temperature of 140° C. The mixture is maintained at this temperature until a sample dissolved in water has at the most a weakly opalescent effect after acidification, which will be the case after heating for about ½ hour. There is obtained a yellowish mass which sets when cold, and which consists in the main of the ester glucoside:

$$C_{17}H_{33}COOC_2H_4C_6H_{11}O_5$$

This compound dissolves in water, yielding a clear frothing liquid. Instead of oleic soap an equivalent quantity of naphthenic soap may also be used, and in this case the corresponding ester glucoside is obtained.

10. 3.3 parts of chloroxypropyl glucoside, 68 per cent strong, according to Example 2, are stirred with 2.5 parts of water, with the application of heat, until thickly liquid, and mixed with a mixture of 1.5 parts of chloroctyl phenol, 0.55 part caustic potash, 0.6 part of water and 2.5 parts of alcohol, and heated for three hours in a water bath. After conversion, there is obtained the chloroctyl phenol ether of ethylol glucoside, which is soluble in water. Chloroctyl phenol is obtained by condensing phenol with an olefinic cracked benzine (boiling point 125–145° C.) in a manner known per se, fractionating and chlorinating the condensation product consisting in the main of octyl phenol.

11. 8 parts of alkali lignine purified by precipitation are dissolved in 30 parts of water with the aid of 1 part of NaOH; 8.5 parts of beta-chloroethyl glucoside, 70 per cent strong, are added, and the clear mixture boiled for about ten hours on a reflux condenser after which a sample when diluted with water and treated with a few drops of acetic acid remains clear.

12. 3.8 parts of isobutyllignin (according to Haegglund, Cellulosechemie 1927, page 72) are dissolved in 9.2 parts of a 6.5 per cent caustic soda solution, and after the addition of 4 parts of 76 per cent beta-chloroethyl glucoside, boiled on a reflux condenser until a sample in water gives no precipitate after acidification with acetic acid, which is the case after some 1 to 1½ hours.

13. 55 parts of casein are dissolved with 2 parts of sodium hydroxide in 140 parts of water. 22.5 parts of the casein solution are mixed with 7 parts of 72 per cent beta-chloroethyl glucoside and heated for 1½ hours to a temperature of about 95° C. There is obtained a mass which is thick when cold and which dissolves in water to form an opalescent solution.

14. 7.8 parts of beta-methylaminoethyl glucoside solution, 33 per cent strong, according to Example 7 are admixed with a solution of 0.5 part of calcined soda in two parts of water, immediately followed by the addition of 3 parts of octyl benzene sulfochloride. The mixture is thoroughly agitated and gradually heated to a temperature of 50 to 60° C., at which temperature it is retained for about ½ hour while stirring. The mixture, which is initially cloudy, becomes clear and thick. It then dissolves in water yielding a clear to weakly opalescent solution, the effective constituent of which being octyl-benzenesulfomethylaminoethyl glucoside. The octyl benzene is obtained by condensing the olefines of a cracked benzine (boiling point 125–145° C.) with benzene in a manner known per se, using aluminium chloride as catalyst. The fraction passing over at 235–245° C., which consists mainly of octyl benzene, is then converted into sulfochloride by means of chlorosulphonic acid.

15. 6.5 parts of beta-aminochloroethyl glucoside solution, 33 per cent strong, 1 part of formaldehyde solution, 35 per cent strong, and 1 part of phenol are mixed together and heated for 8 to 10 hours to a temperature of 75 to 80° C. The small quantity of unaltered phenol is driven off with steam leaving a residue of solution of oxybenzylaminoethyl glucoside.

16. 13 parts of the solution according to Example 6 are mixed with 16 parts of water and 30 parts of alcohol, after which at a temperature below 15° C. there is introduced, drop by drop, while stirring, a solution of 4.3 parts of lauric acid chloride, alternating with a solution of 1.4 parts of calcined soda and 8 parts of water. After evaporation of the solvent and dissolving of the residue in water there is obtained a clear frothing solution of laurylaminoethyl glucoside which remains unaffected by the addition of dilute alkaline solutions and dilute acids. Only boiling for several hours with dilute sulphuric acid (5 grams per litre) effects partial hydrolysis.

17. 13.5 parts of the solution according to Example 6 are admixed with 20 parts each of methyl alcohol and water, and a solution of benzene is introduced, drop by drop, with agitation, at a temperature of 10 to 15° C. To neutralise the hydrochloric acid evaporated, a solution of 1.5 parts of calcined soda in 8 parts of water is, at the same time, introduced.

After evaporation of the alcohol and benzene there is obtained a residue consisting substantially of oleylmethylaminoethyl glucoside of the formula

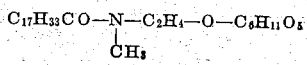

This residue gives a clear solution in water and is unaffected by dilute alkaline solutions and acid.

18. 8.5 parts of a beta-aminoethyl glucoside solution according to Example 6 are mixed with 2.5 parts of stearic acid, heated in a vacuum first of all for driving off the solvent, and then for a longer time to a temperature of about 160–170° C., until a sample dissolved in water does not become clouded or only becomes clouded to a slight extent. On the addition of acid the substance obtained is a brownish mass consisting in the main of stearoylaminoethyl glucoside.

19. 15 parts of beta-aminoethyl glucoside solution obtained in accordance with Example 6 are mixed with 10 parts of alcohol, after which a solution of 2.5 parts of abietinic acid chloride in 10 parts of benzene is added, drop by drop, while agitating and cooling the solution to a temperature of 5 to 10° C. After driving off the solvent there is obtained a clear yellow solution containing abietinyl aminoethyl glucoside. The glucoside, owing to the size of its hydrocarbon residue which is linked to the sugar, is difficultly soluble in water but is readily retained in solution by resin soap still present. On the other hand, it tends to prevent the precipitation of resin soap by constituents causing the hardness of water.

20. 1 part of sodium hydroxide is added to 50 parts of a solution of a rape seed oil fatty acid-methylaminoethyl-glucoside and -galactoside, obtained from chlorides of rape seed oil fatty acids and a mixture of methylaminoethyl-glucoside and methylaminoethyl-galactoside, the said solution being 20 per cent strong. Ethylene oxide is introduced into this solution until the increase of weight amounts to 3 parts. The wetting power of the glucoside treated in the manner described above is far better than that of the untreated product.

21. 100 parts of a solution of stearoylaminoethyl-arabinoside (5 per cent strong) are allowed to react with 0.25 parts of sodium hydroxide and 4 to 5 parts of propylene oxide. The solution of the reaction products thus obtained has an increased washing capacity when compared with the untreated product.

22. 3 parts of sodium acetate are added to 50 parts of a mixture of stearoyl- and a palmitoyl-methylaminoethyl-glucoside (obtained by reacting upon a methylaminoethyl-glucoside with acid chlorides of commercial stearine), the said solution being 10 per cent strong. Bromine water, saturated in the cold is gradually introduced into this solution in such an amount, that about 2 parts of bromine are used in total. The oxidation of the primary sugar hydroxyl group proceeds only slowly, so that the reaction mixture has to stand for 1 to 2 days at about 30° C. The solution produced by this method has a better cleaning effect in washing soiled cotton than the untreated product.

23. 14 parts of sodium hydroxide are added to 100 parts of a dispersion of stearoylmethylaminoethyl-glucoside, 20 per cent strong, and shaken with 40 parts of dimethyl sulfate introduced in small portions while cooling to about 10–15° C. The reaction product obtained has a higher efficiency for protecting calcium soaps freshly formed from flocculation than the glucoside not treated with dimethyl sulfate.

24. Palmitoylmethylaminoethyl - glucoside is several times recrystallized from a benzene solution. 1 part of the thus purified starting material is finally dispersed in 100 parts of acetone containing 2 per cent of hydrochloric acid gas and the dispersion shaken until the palmitoyl-methylaminoethyl-glucoside has been dissolved in the main. The solution is then poured into the calculated amount of cold diluted sodium hydroxide solution and the thus obtained neutral solution is evaporated to dryness in a vacuum. The resulting reaction product dissolves clearly in water and has an improved washing and cleansing capacity when used for treating cotton spotted with cocoa, compared with the nonacetalized glucoside.

25. 2 parts of sodium hydroxide and 5 parts of dimethyl sulfate are added portion by portion to a solution of lauroyl-methylaminoethyl-glucoside, 10 per cent strong, while cooling. The clear frothing solution has a stronger capillary activity than the starting material.

26. 1 part of sodium hydroxide and 3 parts of benzoylchloride are added to a solution of 10 parts lauroyl-methylaminoethyl-arabinoside and the solution is shaken until the reaction has proceeded to completion. The reaction product has more capillary activity than the untreated arabinoside.

27. 30 parts of a 33 per cent solution of methyl-aminoethyl glucoside according to Example 7 are heated with 5 parts of dodecyl bromide and 20 parts of alcohol for 4 hours, with stirring, to a temperature of 125 to 130° C. There is obtained a clear liquid which dissolves in water with frothing to give a clear solution.

28. 0.5 part of sodium hydroxide are added to 100 parts of a 10 percent solution of octadecyl-methyl-aminoethyl-glucoside and ethylene oxide is introduced into this solution at room temperature until the increase of weight amounts to 30 parts. A clear, well frothing solution is obtained.

If wool is washed with a solution of the untreated octadecyl methylamino-glucoside at a pH value below 5 no washing effect is obtained at all. However by washing the wool with a solution of the said compound treated with ethylene oxide, the conditions being otherwise the same, a beautiful white wool is obtained.

29. 0.5 part of sodium hydroxide is added to 100 parts of a 10 per cent solution of hexadecyl-aminoethyl-glucoside and 25 to 30 parts of propylene oxide are introduced into this solution at room temperature. The reaction product dissolves clearly in water and exerts a good washing effect when used in the acid washing treatment of wool; the untreated hexadecylaminoethyl-glucoside having under the same conditions no washing effect at all.

30. 10 parts of octadecylaminoethyl-glucoside purified by repeated recrystallisation from benzene are heated with 2 parts of gylcerol chlorohydrin and 1 part of finely powdered calcined sodium carbonate to a temperature of 70 to 80° C. until the odour of glycerol chlorohydrin has practically disappeared. The reaction product has been found of high value for use in vat dyeing.

31. A purified octadecyl-aminoethyl-glucoside is heated with the equivalent amount of a chloroethyl ether of polyglycols or with polyglycerol chlorohydrin at a temperature of about 80° C. while adding finely powdered calcined sodium carbonate. The resulting reaction product is more readily soluble in water than the untreated hexadecyl-aminoethyl-glucoside and is an improved leveling agent in vat dyeing.

32. Hexadecyl-aminoethyl-glucoside obtained from 6 parts of hexadecyl-amine and 10 parts of chloroethyl-glucoside (containing 62 per cent of the pure compound) 1.5 parts of calcined sodium carbonate and 30 parts of alcohol are heated in an autoclave with 10 additional parts of chloroethyl-glucoside (62 per cent) to a temperature of 140 to 145° C. The solution is separated by filtration after cooling from solid and oily matter, the alcohol is evaporated and the hexadecyl-aminodiethyl-glucoside obtained is dissolved in water, whereby a clear solution is obtained. This solution may be used for washing operations in the whole range of pH values between 0 to 14. The monoglucoside is not capable of acting in this manner.

33. 25 parts of a dispersion of 20 per cent of hexadecyl-methylaminoethyl-glucoside are treated with 1.8 parts of dimethyl sulfate and 0.3 part of sodium carbonate, whereby the nitrogen atom is changed to quaternary form. The reaction proceeds at ordinary temperature. The reaction product is more easily soluble than the untreated glucoside and forms solutions which are stable to the influence of alkaline reacting lyes.

34. 14 parts of sodium hydroxide are added to 100 parts of a 20 per cent dispersion of octadecyl-methylaminoethyl-glucoside and shaken with 40 parts of dimethyl sulfate added repeatedly by small portions, while cooling to about 10–15° C. The solution obtained is neutralized and becomes clear when gently heated. It has a considerably better equalizing action in dyeing operations with the aid of substantive dyes more particularly vat dyes than the glucoside before treatment with dimethyl sulfate.

35. 4.5 parts of a purified hexadecyl-aminoethyl-glucoside are heated with reflux with 10 parts of benzene and 1.2 parts benzyl chloride until the odour of benzyl chloride has practically disappeared. After evaporation, preferably in a vacuum, a brownish mass is obtained, the solubility of which is less than that of the nonbenzylized glucoside.

36. A purified hexadecyl-aminoethyl-glucoside is heated with equimolecular amounts of chloroacetic acid and with finely powdered dried sodium carbonate to about 80° C. until the reaction has proceeded to a substantial completion. The brownish melt obtained dissolves in water forming a clear solution. In contradistinction to the behavior of hexadecyl-aminoethyl-glucoside the modified compound has considerable washing capacity when used for washing wool within a pH range of the solution between pH 7 to 11.

In the claims I use the term "low molecular alcohol" to define alcohols having 2 to 5 carbon atoms directly bound to each other; this definition therefore includes besides alcohols having an uninterrupted chain of not more than 5 carbon atoms also alcohols having more than one chain of carbon atoms linked by a hetero-atom such as oxygen provided that each chain contains not more than 5 carbon atoms.

Furthermore I use the term "acid catalyst of the non-reversing type" to define acids or mixtures of acids and acid salts which have practically no or only a slight reversing action that is to say an unfavorable action leading to a formation of a considerable amount of condensed polysaccharoses. Examples of such acid catalysts are mentioned above, in the general description. In contradistinction to "acid catalysts of the non reversing type" hydrochloric acid has a strong reversing action and is therefore not suitable in the present process.

What I claim is:

1. A composition of matter in a powdery state containing predominantly a glucosidic compound having the general formula

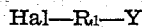

wherein

Hal is a halogen atom
$R_1$ is a bivalent low molecular alkyl radical and
Y is a sugar group glucosidically combined with the alkyl radical $R_1$.

2. A composition of matter containing a substantial amount of a glucosidic compound having the general formula

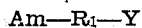

wherein

Am is an amino radical
$R_1$ is a bivalent low molecular alkyl radical and
Y is a sugar group glucosidically combined with the alkyl radical $R_1$.

3. A method of synthetically producing a glucoside which comprises reacting upon a sugar with an alcohol containing 2 to 5 carbon atoms, said alcohol containing at least one halogen atom, said reaction being conducted in contact with an acid catalyst of the non-reversing type.

4. A method of synthetically producing a glucoside which comprises reacting upon a sugar with a low molecular halogenated alcohol having at least two hydroxy groups said reaction being conducted in contact with an acid catalyst of the non-reversing type.

5. A method of synthetically producing a glucoside, which comprises reacting upon a sugar with an excess of an alcohol containing 2 to 5 carbon atoms, said alcohol containing at least one halogen atom bonded to carbon, said reaction being conducted in contact with an acid catalyst of the non-reversing type, adding a material capable of neutralizing acids and distilling off the excess of said alcohol.

6. A method of synthetically producing a glucoside, which comprises reacting upon a sugar with an excess of an alcohol containing 2 to 5 carbon atoms, said alcohol containing at least one halogen atom bonded to carbon, said reaction being conducted in contact with an acid catalyst of the non-reversing type, adding a material capable of neutralizing acids and distilling off the excess of said acohol under pressure substantially below atmospheric.

7. A method of synthetically producing a glucoside, which comprises reacting upon a sugar with an alcohol containing 2 to 5 carbon atoms, said alcohol containing at least one halogen atom, said reaction being conducted in contact with an acid catalyst of the non-reversing type, whereby a halogen-alkyl-glucoside is produced, and coupling the latter with an organic compound, the said reaction substituting an organic radical for a halogen atom contained in said halogen-alkyl-glucoside.

8. A method of synthetically producing a glucoside, which comprises reacting upon a sugar with an alcohol containing 2 to 5 carbon atoms, said alcohol containing at least one reactive halogen atom, said reaction being conducted in contact with an acid catalyst of the non-reversing type, whereby a halogen-alkyl-glucoside is produced, and reacting upon the thus obtained halogen-alkyl-glucoside with a salt of a high molecular organic acid.

9. A method of synthetically producing a glucoside, which comprises reacting upon a sugar with an alcohol containing 2 to 5 carbon atoms, said alcohol containing at least one reactive halogen atom, said reaction being conducted in contact with an acid catalyst of the non-reversing type, whereby a halogen-alkyl-glucoside is produced, and reacting upon the thus obtained halogen-alkyl-glucoside with a phenolate.

10. A method of synthetically producing a glucoside, which comprises reacting upon a sugar with an alcohol containing 2 to 5 carbon atoms, said alcohol containing at least one reactive halogen atom, said reaction being conducted in contact with an acid catalyst of the non-reversing type, whereby a halogen-alkyl-glucoside is produced, and reacting upon the thus obtained halogen-alkyl-glucoside with an aminating agent to obtain an amino-alkyl-glucoside.

11. A method of synthetically producing a glucoside, which comprises reacting upon a sugar with an alcohol containing 2 to 5 carbon atoms, said alcohol containing at least one reactive halogen atom, said reaction being conducted in contact with an acid catalyst of the non-reversing type, whereby a halogen-alkyl-glucoside is produced, and reacting upon the thus obtained halogen-alkyl-glucoside with a primary amine to obtain an amino-alkyl-glucoside and acylating the said amino-alkyl-glucoside.

12. A method of synthetically producing a glucoside, which comprises reacting upon a sugar with an alcohol containing 2 to 5 carbon atoms, said alcohol containing at least one reactive halogen atom, said reaction being conducted in contact with an acid catalyst of the non-reversing type, whereby a halogeno-alkyl-glucoside is produced, and reacting upon the thus obtained halogeno-alkyl-glucoside with a high molecular amine.

13. A method of synthetically producing a glucoside, which comprises reacting upon a sugar with an alcohol containing 2 to 5 carbon atoms, said alcohol containing at least one halogen atom, said reaction being conducted in contact with an acid catalyst of the non-reversing type, whereby a halogen-alkyl-glucoside is produced, and reacting upon the latter with an organic compound capable of coupling with said halogen-alkyl-glucoside with separation of a metal halide.

AUGUST CHWALA.